United States Patent
Takasugi et al.

(10) Patent No.: US 12,305,305 B2
(45) Date of Patent: May 20, 2025

(54) ELECTROCHEMICAL HYDROGEN COMPRESSOR

(71) Applicant: HONDA MOTOR CO., LTD., Tokyo (JP)

(72) Inventors: Shoji Takasugi, Wako (JP); Hiroshi Yoshimura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 454 days.

(21) Appl. No.: 17/668,493

(22) Filed: Feb. 10, 2022

(65) Prior Publication Data

US 2022/0298656 A1 Sep. 22, 2022

(30) Foreign Application Priority Data

Mar. 19, 2021 (JP) ................. 2021-046010

(51) Int. Cl.
| | |
|---|---|
| C25B 9/65 | (2021.01) |
| C25B 1/04 | (2021.01) |
| C25B 9/19 | (2021.01) |
| C25B 13/00 | (2006.01) |
| F04B 45/047 | (2006.01) |
| F04B 53/06 | (2006.01) |

(52) U.S. Cl.
CPC .......... *C25B 9/65* (2021.01); *C25B 9/19* (2021.01); *C25B 13/00* (2013.01); *F04B 45/047* (2013.01); *F04B 53/06* (2013.01); *C25B 1/04* (2013.01)

(58) Field of Classification Search
None
See application file for complete search history.

(56) References Cited

U.S. PATENT DOCUMENTS

| | | | |
|---|---|---|---|
| 7,659,024 B2 * | 2/2010 | Matsumoto | H01M 8/2483 429/434 |
| 2010/0068590 A1 * | 3/2010 | Darling | H01M 8/04291 429/415 |
| 2010/0213051 A1 | 8/2010 | Ishikawa et al. | |

(Continued)

FOREIGN PATENT DOCUMENTS

| | | |
|---|---|---|
| CN | 101818357 A | 9/2010 |
| CN | 209906895 U | 1/2020 |

(Continued)

OTHER PUBLICATIONS

Office Action dated Oct. 4, 2022, issued over the corresponding Japanese Patent Application No. 2021-046010.

(Continued)

*Primary Examiner* — Louis J Rufo
(74) *Attorney, Agent, or Firm* — Carrier, Shende & Associates P.C.; Fulchand P. Shende; Joseph P. Carrier

(57) ABSTRACT

An electrochemical hydrogen compressor comprises a unit cell that includes: an electrolyte membrane having hydrogen ion conductivity; an anode current collector stacked on one main surface side of the electrolyte membrane, a support member (for example, a flow field member or an anode separator) arranged so as to face the anode current collector; and a cathode current collector stacked on another main surface side of the electrolyte membrane, wherein the anode current collector is formed of a hydrophilic conductive material having a plurality of vent holes and has a surface facing the support member, the surface being subjected to a water-repellent treatment.

5 Claims, 4 Drawing Sheets

(56) References Cited

U.S. PATENT DOCUMENTS

| | | | |
|---|---|---|---|
| 2018/0187319 A1 | 7/2018 | Yakumaru et al. | |
| 2019/0319276 A1* | 10/2019 | Oto | C01B 32/30 |
| 2020/0023306 A1 | 1/2020 | Ukai et al. | |
| 2020/0023309 A1* | 1/2020 | Tian | B01D 53/56 |
| 2020/0350604 A1 | 11/2020 | Ukai et al. | |
| 2021/0372379 A1* | 12/2021 | Nakaue | F03G 7/0121 |
| 2022/0298652 A1* | 9/2022 | Yamagiwa | C25B 15/02 |

FOREIGN PATENT DOCUMENTS

| | | | |
|---|---|---|---|
| CN | 111836919 A | | 10/2020 |
| JP | 2006004787 A | * | 1/2006 |
| JP | 2008010433 A | * | 1/2008 |
| JP | 2012-180553 A | | 9/2012 |
| JP | 2015-086453 A | | 5/2015 |
| JP | 2016-160462 A | | 9/2016 |
| JP | 2018-109221 A | | 7/2018 |
| JP | 2020-015930 A | | 1/2020 |
| JP | 2020-020037 A | | 2/2020 |
| JP | 2020-152958 A | | 9/2020 |
| JP | 2020172672 A | * | 10/2020 |
| WO | 2017/010372 A1 | | 1/2017 |

OTHER PUBLICATIONS

Office Action dated Jul. 8, 2023 issued over the corresponding Chinese Patent Application No. 202210173475.5 with the machine English translation thereof.

* cited by examiner

ELECTROCHEMICAL HYDROGEN COMPRESSOR

CROSS-REFERENCE TO RELATED APPLICATIONS

This application is based upon and claims the benefit of priority from Japanese Patent Application No. 2021-046010 filed on Mar. 19, 2021, the contents of which are incorporated herein by reference.

BACKGROUND OF THE INVENTION

Field of the Invention

The present invention relates to an electrochemical hydrogen compressor using an electrolyte membrane having hydrogen ion conductivity.

Description of the Related Art

Electrochemical cells in which catalyst layers and electrodes are provided on both sides of an electrolyte membrane having hydrogen ion conductivity are used in fuel cells, water electrolysis devices, electrochemical hydrogen compressors, and the like. For example, an electrochemical hydrogen compressor has a configuration similar to that of a water electrolysis apparatus, and can generate high-pressure hydrogen necessary for a fuel cell electric vehicle or the like with only one stage. Electrochemical hydrogen compressors have the advantage of being smaller in size and operating with less noise than mechanical hydrogen compressors.

In an electrochemical hydrogen compressor, a current collector is bonded to a catalyst layer of an electrolyte membrane. The electrolyte membrane is flanked by the current collectors to form a membrane electrode assembly. As the current collector, for example, a porous material is used that has conductivity of a stack body of a water-repellent treated carbon fiber layer or metal mesh (JP 2020-020037 A). Further, the electrochemical hydrogen compressor, since a differential pressure acts on the electrolyte membrane, has a support member such as a separator at a portion adjacent to the current collector located on the anode side.

SUMMARY OF THE INVENTION

The electrolyte membrane of an electrochemical hydrogen compressor needs to contain a certain amount of water in order to prevent an increase in resistance. Therefore, water (water vapor) is added beforehand to the anode gas (e.g., hydrogen gas) supplied to the electrochemical cell with a bubbler or the like.

However, depending on the operating conditions and the layout conditions of the electrochemical hydrogen compressor, the temperature of the electrolyte membrane may become higher than a predetermined temperature, and the electrolyte membrane may be easily dried. As a result, the resistance value of the electrolyte membrane increases. To prevent the potential difference between the electrodes from increasing too much, the electrochemical cell has a problem that the amount of hydrogen to be treated is limited.

As a method for increasing the amount of water supplied to the electrolyte membrane, it is conceivable to change the material of the current collector. However, in this method, there is a case where the frictional resistance between the current collector and the support member increases under the condition that the differential pressure is exerted. As a result, there arises a problem that the ventilation holes of the current collector are blocked by the fragments caused by wear.

In view of the foregoing, it is an object of one embodiment to provide an electrochemical hydrogen compressor capable of preventing closing of ventilation holes of a current collector while preventing an electrolyte membrane from drying out.

One aspect of the disclosure below is that an electrochemical hydrogen compressor is provided with a unit cell that includes: an electrolyte membrane having hydrogen ion conductivity; an anode current collector stacked on one main surface side of the electrolyte membrane; a support member arranged so as to face the anode current collector, and a cathode current collector stacked on another main surface side of the electrolyte membrane, wherein the anode current collector is formed of a hydrophilic conductive material having a plurality of vent holes and has a surface facing the support member, the surface being subjected to a water-repellent treatment.

According to the electrochemical hydrogen compressor of the above aspect, since the anode current collector is hydrophilic, it is possible to prevent the electrolyte membrane from drying out. Further, even if the anode current collector is pressed toward the support member, the water-repellent treated portion can easily slide relative to the support member. Therefore, mutual wear can be prevented and clogging of the anode current collector can be prevented.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

A preferred embodiment of a electrochemical hydrogen compressor will now be described in detail with reference to the accompanying drawings.

Figure 1:
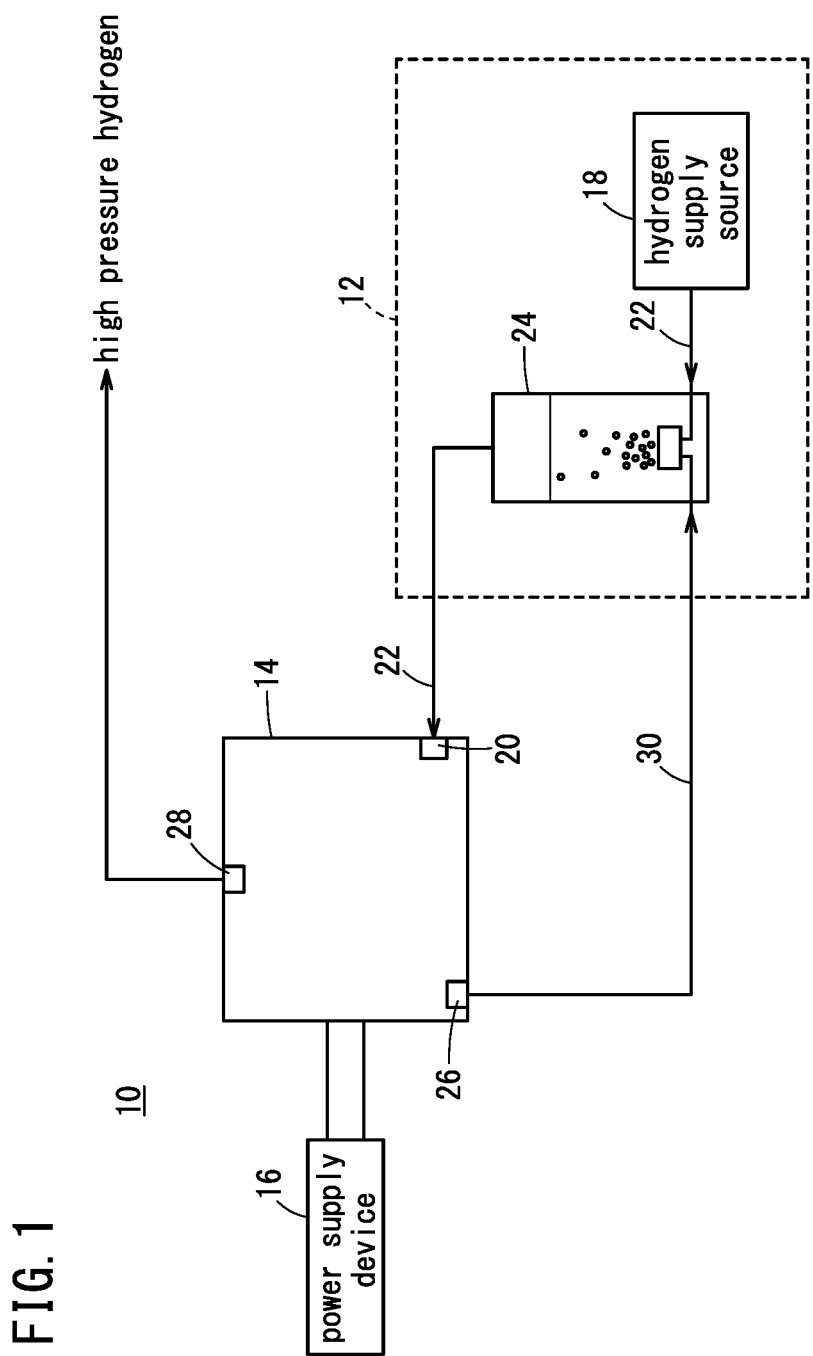
FIG. 1 is a schematic diagram showing a configuration of a hydrogen compressor including an electrochemical hydrogen compressor according to an embodiment.

As shown in FIG. 1, a hydrogen compressor 10 according to the present embodiment includes a hydrogen supply unit 12, an electrochemical hydrogen compressor 14, and a power supply device 16. The hydrogen supply unit 12 supplies hydrogen gas to the electrochemical hydrogen compressor 14. The hydrogen supply unit 12 has a hydrogen gas introduction path 22 connecting a hydrogen supply source 18 and an introduction port 20 of the electrochemical hydrogen compressor 14. The hydrogen gas introduction path 22 has a bubbler 24 on the way. The bubbler 24 allows hydrogen gas to pass, in the form of bubbles, through a container in which water is stored, thereby allowing the hydrogen gas to contain water vapor. The bubbler 24 adjusts the amount of water vapor contained in the hydrogen gas according to the water temperature inside the container.

The electrochemical hydrogen compressor 14 has the introduction port 20, a discharge port 26, and a high-pressure hydrogen port 28. The introduction port 20 introduces hydrogen gas from the hydrogen supply unit 12 through the hydrogen gas introduction path 22. The discharge port 26 discharges hydrogen gas that has not been transported to the high-pressure side of an electrolyte membrane 58 (see FIG. 3). The bubbler 24 is connected to the discharge port 26 of the electrochemical hydrogen compressor 14 via a circulation channel 30.

The high-pressure hydrogen port 28 communicates with a cathode side of a unit cell 46 to be described later. The high-pressure hydrogen port 28 allows hydrogen gas compressed at a high pressure to flow out.

The power supply device 16 generates high-pressure hydrogen gas by supplying drive power to each unit cell 46 of the electrochemical hydrogen compressor 14. The hydrogen compressor 10 of the present embodiment is configured as described above. The structure of the electrochemical hydrogen compressor 14 will be described below.

Figure 2:
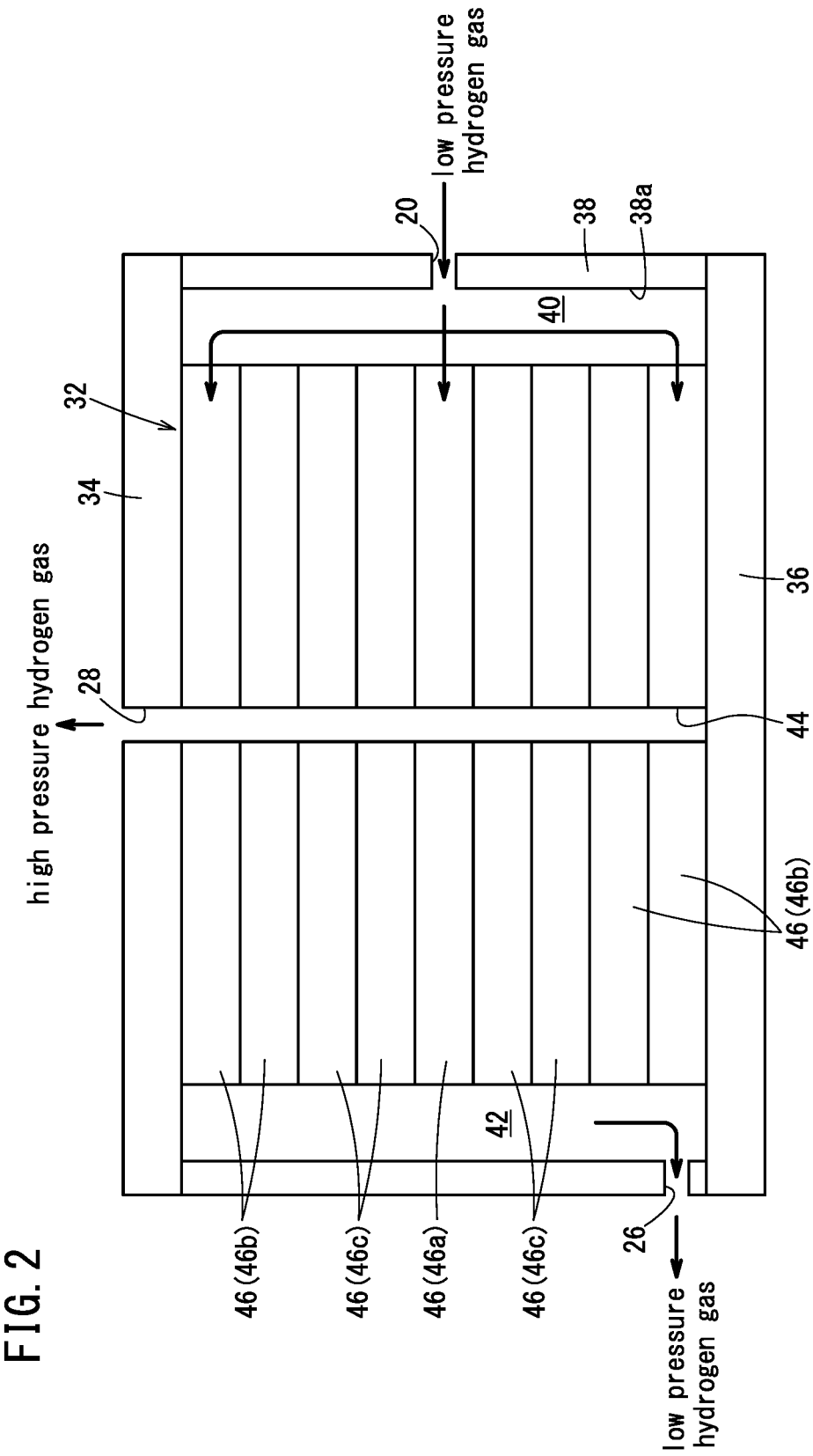
FIG. 2 is a cross-sectional view of the electrochemical hydrogen compressor of FIG. 1.

As shown in FIG. 2, the electrochemical hydrogen compressor 14 includes a cell stack 32 in which a plurality of unit cells 46 are stacked in the thickness direction. A first end plate 34 is disposed at one end of the cell stack 32 in the stacking direction. A second end plate 36 is disposed at the other end of the cell stack 32 in the stacking direction. The cell stack 32 is sandwiched between the first end plate 34 and the second end plate 36. The first end plate 34 and the second end plate 36 apply a predetermined fastening load to the cell stack 32.

The first end plate 34 and the second end plate 36 have a larger planar shape than the cell stack 32. The electrochemical hydrogen compressor 14 has a side portion 38 for bridging a space between an outer peripheral portion of the first end plate 34 and an outer peripheral portion of the second end plate 36. The side portion 38 surrounds an outer peripheral portion of the cell stack 32 and hermetically partitions an internal space 38a in which the cell stack 32 is arranged. The side portion 38 has the introduction port 20. The side portion 38 has the discharge port 26 on the side opposite to the side on which the introduction port 20 is provided.

In the internal space 38a, in a portion adjacent to the introduction port 20, a distribution field 40 communicating with the anode side of the plurality of unit cells 46 is provided. As shown by arrows in FIG. 2, the distribution field 40 distributes the hydrogen gas introduced from the introduction port 20 and supplies it to the anode side of each unit cell 46.

Further, in the internal space 38a, in a portion adjacent to the discharge port 26, a collective flow field 42 communicating with the anode side of the plurality of unit cells 46 is provided. In the collective flow field 42, as shown by arrows, the excess hydrogen gas not consumed in each unit cell 46 is combined. The hydrogen gas in the collective flow field 42 is discharged from the discharge port 26.

The cell stack 32 has a communication hole 44 penetrating through each unit cell 46 in the thickness direction at a central portion thereof. The communication hole 44 communicates with the cathode side of each unit cell 46. The communication hole 44 is connected to the high-pressure hydrogen port 28 and allows the cathode side of each unit cell 46 and the high-pressure hydrogen port 28 to communicate with each other. The high-pressure hydrogen gas compressed in each unit cell 46 is led to the high-pressure hydrogen port 28 through the communication hole 44.

In the cell stack 32 described above, heat is generated from each unit cell 46 in accordance with the compression of hydrogen gas. Heat of each unit cell 46 is mainly exhausted through the first end plate 34 and the second end plate 36. Therefore, in unit cells 46b adjacent to the first end plate 34 and the second end plate 36, the temperature during operation becomes relatively low, and in unit cells 46a and 46c located near the center in the stacking direction, the temperature during operation becomes relatively high.

The amount of water supplied to the unit cells 46a, 46b, and 46c varies depending on the flow rate distribution of the humidified hydrogen gas. The distribution field 40 has a large flow rate distribution of hydrogen gas to the unit cell 46a, which is located at a portion facing the introduction port 20. Therefore, a sufficient amount of water is supplied to the unit cell 46a. Also the unit cells 46b staying at a relatively low temperature is given a sufficient amount of water. On the other hand, the unit cells 46c near the center of the cell stack 32 tend to lack moisture.

Therefore, in the present embodiment, as will be described below, the unit cells 46a and 46b of the cell stack 32 have a first cell structure 48 (see FIG. 3) that is excellent in drainage of condensed water. Further, the unit cells 46c, which is easily dried, have a second cell structure 50 (see FIG. 4) in which the water supply capacity is enhanced.

Figure 3:
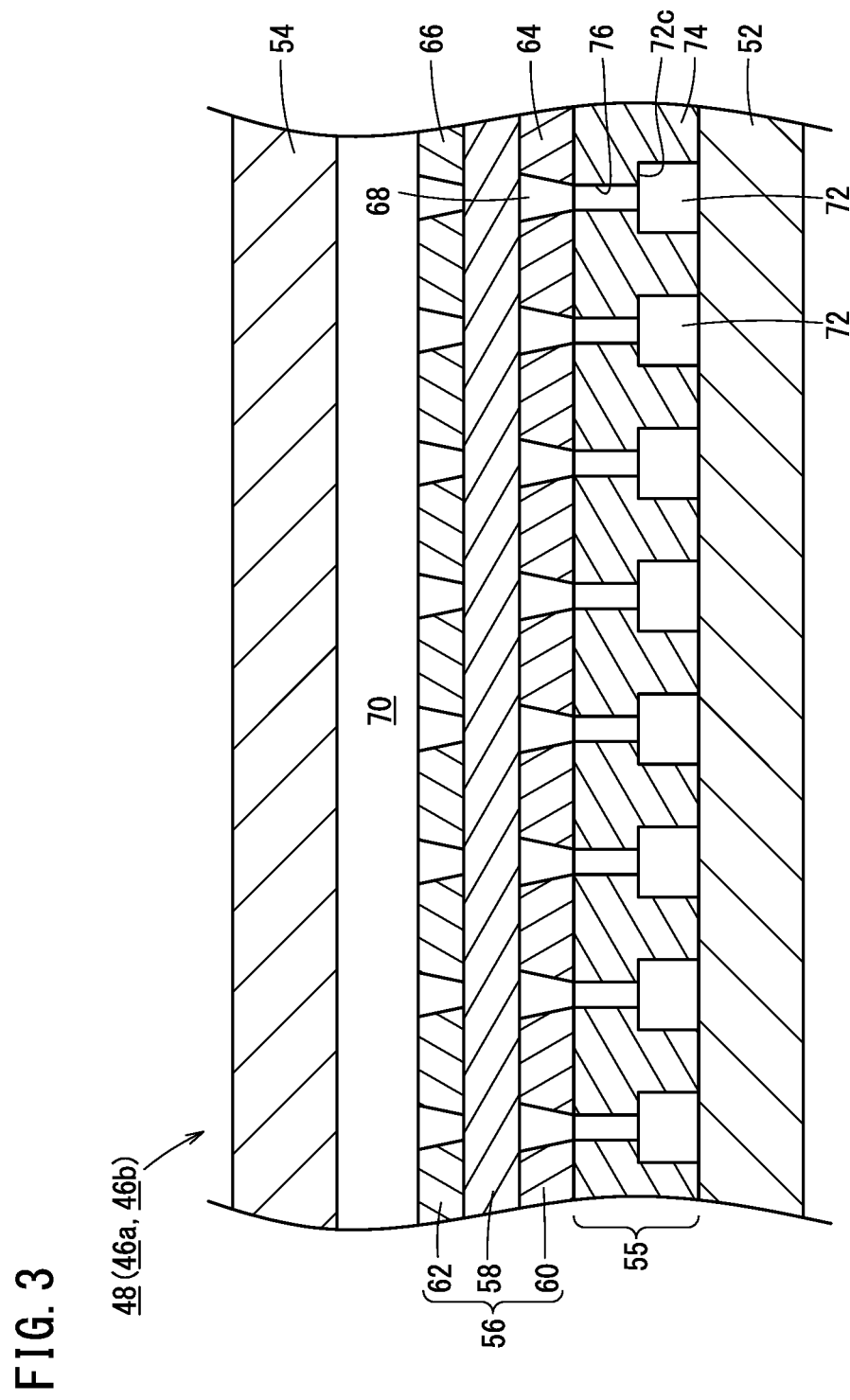
FIG. 3 is a cross-sectional view showing a configuration of unit cells arranged in a wet region of FIG. 2.

As shown in FIG. 3, the first cell structure 48 includes a membrane electrode assembly (hereinafter referred to as "MEA 56"), an anode separator 52, a cathode separator 54, and a flow field member 55 (support member). The MEA 56 is sandwiched between the anode separator 52 and the cathode separator 54. For example, the anode separator 52 and the cathode separator 54 are formed in corrugated shapes by press-forming, for example, a steel plate, a stainless steel plate, an aluminum plate, a plated steel plate, or a metal thin plate whose metal surface is subjected to a surface treatment for corrosion prevention.

The MEA 56 includes the electrolyte membrane 58, an anode electrode 60 provided on one surface of the electrolyte membrane 58, and a cathode electrode 62 provided on the other surface of the electrolyte membrane 58. The electrolyte membrane 58 is, for example, a solid polymer electrolyte membrane (cation exchange membrane), and is made up from, for example, a thin film of perfluorosulfonic acid containing water. The anode side of the electrolyte membrane 58 may be reinforced with a protective sheet (not shown) containing a fibrous skeleton. For the electrolyte membrane 58, an HC (hydrocarbon)-based electrolyte can be used as well as the fluorine-based electrolyte. The electrolyte membrane 58 is sandwiched between the anode electrode 60 and the cathode electrode 62.

Although not shown in detail, the anode electrode 60 has an anode catalyst layer bonded to one surface of the electrolyte membrane 58. The anode catalyst layer is formed of a carbon porous body on which catalyst particles such as platinum are supported. An anode current collector 64 is stacked on the anode catalyst layer.

The anode current collector 64 is a plate-like member formed of a conductive material such as metal or carbon. The anode current collector 64 contacts the anode catalyst layer of the MEA 56 to supply current to the MEA 56. The anode current collector 64 also serves as a gas diffusion layer for supplying hydrogen gas to the anode catalyst layer, and has a plurality of vent holes 68. The vent holes 68 of the anode current collector 64 has a porous or multilayer mesh structure. The vent holes 68 have a flow field structure for allowing hydrogen gas to flow in the thickness direction.

The anode current collector 64 may be formed by stacking a plurality of metal meshes in which vent holes 68 having different diameters are formed. That is, a vent hole 68 is not limited to a single continuous hole penetrating in the thickness direction, but a plurality of holes communicating with each other in the thickness direction may form the vent hole 68. In this case, the change in the diameter of the vent hole 68 in the figure reflects the size of the hole in each layer that exists in the thickness direction. For example, the anode current collector 64 may be formed of metal meshes having different mesh diameters or may be formed by stacking carbon fiber sheets having different diameters.

Further, the vent hole 68 may be a hole penetrating from the main surface of the anode current collector 64 on the side away from the electrolyte membrane 58 to the main surface of the anode current collector 64 on the side close to the electrolyte membrane 58. In this case, the cross-sectional area of the vent hole 68 gradually increases as the vent hole 68 approaches the main surface on the side close to the electrolyte membrane 58. The surface of the anode current collector 64 including the vent holes 68 is water-repellent processed over the entire area in the thickness direction and is covered with a water-repellent material.

The cathode electrode 62 has a cathode catalyst layer bonded to the other surface of the electrolyte membrane 58. A cathode current collector 66 is stacked on the cathode catalyst layer. The cathode current collector 66 is formed, for example, by stacking a plurality of metal meshes having different mesh diameters. The hole size (mesh diameter) of each metal mesh constituting the cathode current collector 66 becomes smaller as the layer is closer to the MEA 56.

Between the MEA 56 and the cathode separator 54, there is provided a high-pressure hydrogen discharge flow field 70 through which hydrogen gas compressed through the cathode electrode 62 flows. The high-pressure hydrogen discharge flow field 70 communicates with the communication hole 44 penetrating the cell stack 32 in the thickness direction as shown in FIG. 2.

As shown in FIG. 3, the flow field member 55 that supports the MEA 56 is disposed between the MEA 56 and the anode separator 52. The flow field member 55 has flow field grooves 72 formed on a side closer to the anode separator 52. A plurality of flow field grooves 72 are arranged at intervals in the flow field width direction. Hydrogen gas flowing in from the introduction port 20 is supplied to the MEA 56 through the flow field grooves 72.

The flow field grooves 72 extends in a direction perpendicular to the paper surface of FIG. 3. Convex portions 74 are formed on both sides of a flow field groove 72 in the width direction. The convex portions 74 contact the anode separator 52 and support the MEA 56. A first end portion (one end portion in the extending direction) of the flow field groove 72 communicates with the distribution field 40. A second end portion (the other end portion in the extending direction) of the flow field groove 72 communicates with the collective flow field 42. The flow field groove 72 allows hydrogen gas to flow from the first end portion toward the second end portion.

One end of a through hole 76 is opened at a bottom portion 72c of the flow field groove 72 of the flow field member 55. The through hole 76 penetrates the flow field member 55 in the thickness direction. The other end of the through hole 76 opens to a surface of the flow field member 55 on the side closer to the MEA 56. The other end of the through hole 76 is connected to the vent hole 68 of the anode current collector 64. The through hole 76 allows the flow field groove 72 and the vent hole 68 to communicate with each other. The plurality of through holes 76 are arranged at intervals in the direction the flow field groove 72 extends (the direction perpendicular to the paper surface of FIG. 3).

The first cell structure 48 is configured as described above. Next, the second cell structure 50 will be described with reference to FIG. 4. In the configuration of the second cell structure 50, the same components as those of the first cell structure 48 in FIG. 3 are denoted by the same reference numerals, and detailed description thereof will be omitted.

Figure 4:
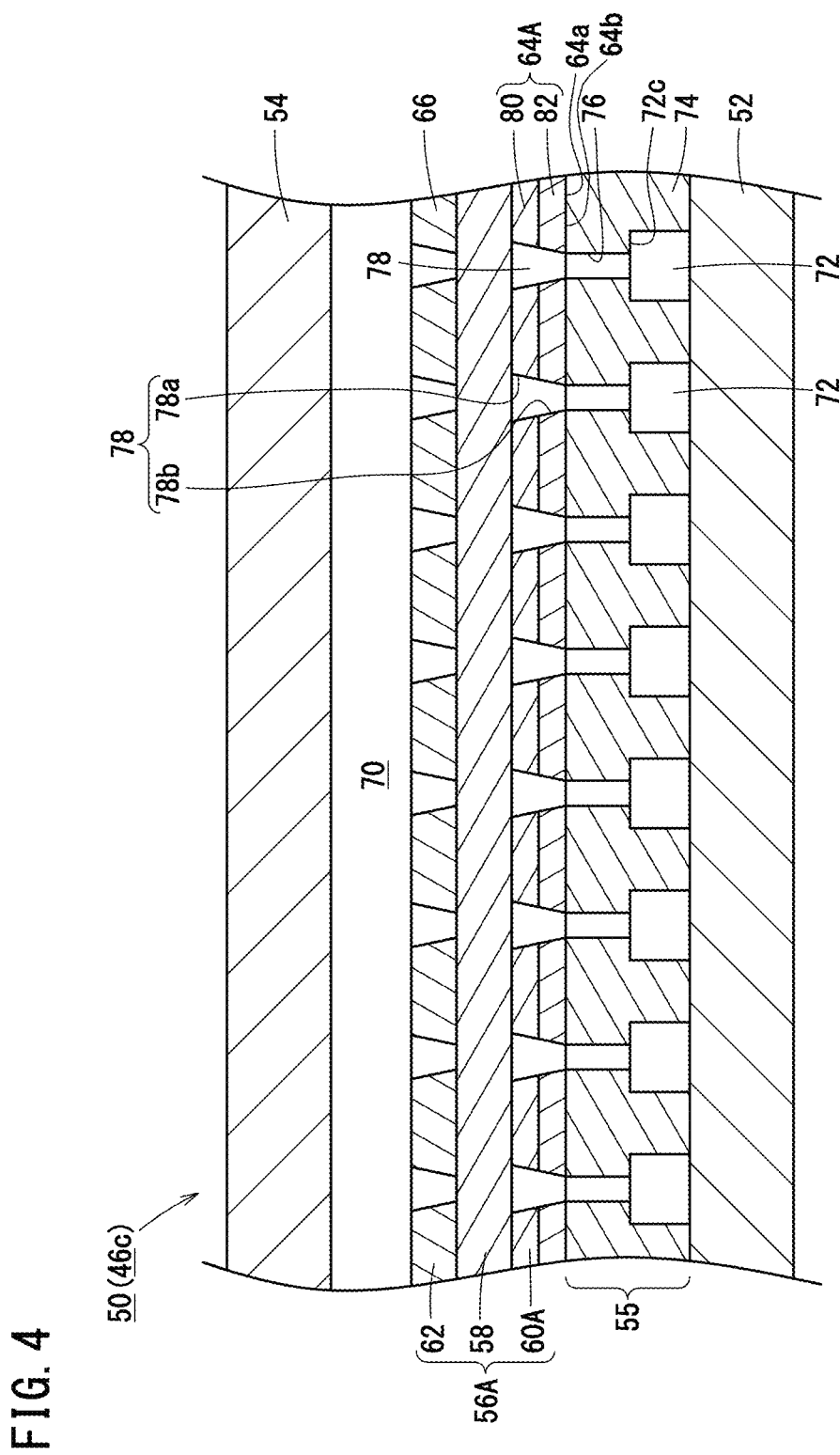
FIG. 4 is a cross-sectional view showing a configuration of unit cells arranged in a dry region of FIG. 2.

As shown in FIG. 4, the second cell structure 50 includes an MEA 56A, the anode separator 52, the cathode separator 54, and the flow field member 55. The MEA 56A has the electrolyte membrane 58, an anode electrode 60A provided on one surface of the electrolyte membrane 58, and the cathode electrode 62 provided on the other surface of the electrolyte membrane 58. That is, in the second cell structure 50, since the configuration other than the anode electrode 60A is the same as that of the first cell structure 48, description thereof will be omitted.

The anode electrode 60A includes an anode catalyst layer (not shown) and an anode current collector 64A stacked on the anode catalyst layer. The anode catalyst layer is a catalyst layer bonded to one surface of the electrolyte membrane 58 and is the same as the anode catalyst layer of the first cell structure 48. The anode current collector 64A is stacked on the anode catalyst layer.

The anode current collector 64A of the present embodiment is formed of a conductive material having a plurality of vent holes 78. Of the anode current collector 64A, only a main surface 64a on the side away from the electrolyte membrane 58 is subjected to the water-repellent treatment. Of the anode current collector 64A, the main surface on the side close to the electrolyte membrane 58 is not subjected to the water-repellent treatment. The anode current collector 64A has an inner current collector 80 provided on the side close to the electrolyte membrane 58 and an outer current collector 82 provided on the side away from the electrolyte membrane 58.

The inner current collector 80 is a plate-like member formed of a conductive hydrophilic material such as metal or carbon. The inner current collector 80 is in contact with the anode catalyst layer of the MEA 56A. Here, the hydrophilic material is a material in which, when stationary water is brought into contact with the surface of the material, the angle (contact angle) between the free surface of the water and the surface of the material is 90° or less. The inner current collector 80 is not subjected to the water-repellent treatment, so that water is more easily retained inside the vent holes 78 than the anode current collector 64 of the first cell structure 48. The inner diameter of a vent hole 78a passing through the portion of the inner current collector 80 (see FIG. 4) is larger than the inner diameter of a vent hole 78b passing through the outer current collector 82.

The outer current collector 82 is a plate-like member formed of a conductive material such as metal or carbon. The outer current collector 82 is stacked on (on the outside of) the inner current collector 80. The outer current collector 82 is subjected to the water-repellent treatment. In the water-repellent treatment, the inner surface of the vent holes 78b penetrating the outer current collector 82 is covered with a water-repellent layer. The vent holes 78b of the outer current collector 82 and the vent holes 78a penetrating the inner current collector 80 are formed being connected to each other. The inner diameter of the vent hole 78a of the inner current collector 80 is larger than the inner diameter of the vent hole 78b of the outer current collector 82.

The second cell structure 50 is configured as described above, and the operation of the electrochemical hydrogen compressor 14 according to the embodiment will be described below.

As shown in FIG. 1, humidified hydrogen gas is supplied to the electrochemical hydrogen compressor 14 through the bubbler 24. As shown in FIG. 2, the hydrogen gas flows in from the introduction port 20, is distributed in the distribution field 40, and is supplied to each unit cell 46.

In the unit cells 46a and 46b of the first cell structure 48 shown in FIG. 3, hydrogen gas is supplied through the flow field grooves 72 of the flow field member 55. Part of the hydrogen gas flowing through the flow field grooves 72 is supplied to the anode current collector 64 through the through holes 76. Hydrogen gas is supplied to the anode catalyst layer through the vent holes 68 of the anode current collector 64 and is converted into protons (H$^+$ ions) through a catalytic reaction. Protons are transported inside the electrolyte membrane 58 toward the cathode electrode 62 under the application of voltage. Protons are converted into hydrogen gas (high pressure) through an electrochemical reaction at the cathode catalyst layer. As a result, compressed hydrogen gas is discharged from the cathode electrode 62. The high-pressure hydrogen gas is collected in the communication hole 44 of FIG. 2 through the high-pressure hydrogen discharge flow field 70 and discharged from the high-pressure hydrogen port 28.

Part of water vapor contained in hydrogen gas is used for humidification of the electrolyte membrane 58. The excess moisture in the electrolyte membrane 58 returns to the anode electrode 60 due to the pressure gradient, and dew condensation occurs at the anode electrode 60. The dew is smoothly discharged by the anode current collector 64 subjected to the water-repellent treatment, and discharged together with the hydrogen gas flowing in the flow field grooves 72 of the flow field member 55.

On the other hand, of the unit cells 46, the unit cells 46c having the second cell structure 50 are supplied with hydrogen gas through the flow field grooves 72 shown in FIG. 4. The inner current collector 80 of the anode current collector 64A of the second cell structure 50 is hydrophilic. Therefore, the ability to retain moisture is high, and drying of the electrolyte membrane 58 can be prevented. The vent hole 78 of the anode current collector 64A is formed in such a shape that the cross-sectional area of the vent hole 78 increases as the vent hole 78 approaches the electrolyte membrane 58. Accordingly, a negative pressure is generated in the vent hole 78, and water vapor (moisture) can be more effectively supplied to the vicinity of the anode catalyst layer.

The outer current collector 82 is disposed between the inner current collector 80 and the flow field member 55. The MEA 56A is pressed toward the anode side by the differential pressure between the cathode side and the anode side, whereby the outer current collector 82 is pressed toward the flow field member 55. The outer current collector 82 is subjected to the water repellent treatment and is covered with a water repellent layer having excellent lubricity. Therefore, the outer current collector 82 and the flow field member 55 are slippery relative to each other. In this state, the outer current collector 82 and the flow field member 55 slide on each other because of thermal expansion of the member, deformation in both directions due to pressure fluctuation, or vibration from the outside. Since wear between the outer current collector 82 and the flow field member 55 is suppressed by the water-repellent layer, fragments due to the wear are less likely to be generated. As a result, the vent holes 78b are prevented from being blocked. Thus, according to the second cell structure 50, the electrolyte membrane 58 can be prevented from drying out. Further, the second cell structure 50 can maintain the amount of hydrogen gas to be treated by preventing the vent holes 78b from being blocked.

The electrochemical hydrogen compressor 14 of this embodiment has the following effects.

The electrochemical hydrogen compressor 14 according to the present embodiment is provided with the unit cell 46 that includes the electrolyte membrane 58 having hydrogen ion conductivity, the anode current collector 64, 64A stacked on one main surface side of the electrolyte membrane 58, the support member (for example, the flow field member 55 or the anode separator 52) arranged so as to face the anode current collector 64, 64A, and the cathode current collector 66 stacked on another main surface side of the electrolyte membrane 58, wherein the anode current collector 64A is formed of a hydrophilic conductive material having a plurality of vent holes 78 and has the surface facing the support member, the surface being subjected to the water-repellent treatment.

The electrochemical hydrogen compressor 14 can supply the electrolyte membrane 58 with a sufficient amount of water. Further, even if the anode current collector 64A is pressed toward the support member side, the anode current collector 64A can slide relative to the support member on the water-repellent treated portion. Therefore, wear between the anode current collector 64A and the support member can be prevented, and the vent holes 78b of the anode current collector 64A can be prevented from being clogged.

In the electrochemical hydrogen compressor 14 described above, the anode current collector 64A is provided with a vent hole 78 extending from the main surface on the side away from the electrolyte membrane 58 to the main surface on the side close to the electrolyte membrane 58, and the cross-sectional area of the vent hole 78 may gradually increase as it approaches the electrolyte membrane 58. Since a negative pressure is generated inside the vent hole 78, the electrochemical hydrogen compressor 14 can more efficiently supply water vapor to the electrolyte membrane 58.

In the electrochemical hydrogen compressor 14 described above, the anode current collector 64A has the hydrophilic inner current collector 80 provided on the side close to the electrolyte membrane 58 and the outer current collector 82 provided on the side away from the electrolyte membrane 58, and the outer current collector 82 may be subjected to the water-repellent treatment. The electrochemical hydrogen compressor 14 can constitute, with a simple structure, an anode current collector 64A in which the water-repellent treatment is applied only to the main surface on the side away from the electrolyte membrane 58.

In the electrochemical hydrogen compressor 14 described above, the vent hole 78a of the inner current collector 80 may be larger than the vent hole 78b of the outer current collector 82.

The electrochemical hydrogen compressor 14 described above has the cell stack 32 in which a plurality of unit cells 46a, 46b having the first cell structure 48 and a plurality of unit cells 46c having the second cell structure 50 are stacked in the thickness direction, wherein the first cell structure 48 is configured in a manner that the entire area of the anode current collector 64 is subjected to the water-repellent treatment, and the second cell structure 50 is configured in a manner that the main surface of the anode current collector 64A on the side away from the electrolyte membrane 58 is subjected to the water-repellent treatment, and the unit cells 46c having the second cell structure 50 may be disposed apart from an end of the cell stack 32 in the stacking direction.

According to the electrochemical hydrogen compressor 14 of this configuration, it is possible to supply a sufficient amount of water to the electrolyte membrane 58 which tends to have high temperature and easily dry out, to prevent the electrolyte membrane 58 from drying out, and to maintain the amount of hydrogen gas to be processed.

Although preferred embodiments of the present invention have been described above, the present invention is not limited to the above-described embodiments, and various modifications can be made without departing from the spirit of the present invention.

What is claimed is:

1. An electrochemical hydrogen compressor comprising a unit cell that includes:
    an electrolyte membrane having hydrogen ion conductivity;
    an anode current collector stacked on one main surface side of the electrolyte membrane;
    a support member arranged so as to face the anode current collector; and
    a cathode current collector stacked on another main surface side of the electrolyte membrane,
    wherein the anode current collector is formed of a hydrophilic conductive material having a plurality of vent holes, and has a contact surface in contact with the support member, the contact surface being covered with a water repellent layer, which is not a hydrophilic material which is a material in which, when stationary water is brought into contact with a surface of the material, a contact angle between a free surface of the water and the surface of the material is 90° or less,
    the anode current collector is in contact with the support member through the water repellent layer, and
    the anode current collector has another surface on a side towards the one main surface side of the electrolyte membrane, said another surface being not covered with the water repellent layer.

2. The electrochemical hydrogen compressor according to claim 1, wherein
    the plurality of vent holes of the anode current collector penetrate from a main surface on a side away from the electrolyte membrane to a main surface on a side close to the electrolyte membrane, and
    a cross-sectional area of each of the vent holes gradually increases as the vent holes come close to the electrolyte membrane.

3. The electrochemical hydrogen compressor according to claim 1, wherein
    the anode current collector includes:
        a hydrophilic inner current collector provided on a side close to the electrolyte membrane; and
        an outer current collector provided on a side away from the electrolyte membrane, and
    the outer current collector is covered with the water repellent layer.

4. The electrochemical hydrogen compressor of claim 3, wherein
    the vent holes of the inner current collector is larger than the vent holes of the outer current collector.

5. The electrochemical hydrogen compressor according to claim 1, comprising
    a cell stack in which a plurality of unit cells having a first cell structure and a plurality of unit cells having a second cell structure are stacked in the thickness direction,
    wherein the first cell structure is configured in a manner that an entire area of the anode current collector covered with to the water repellent layer, and the second cell structure is configured in a manner that a main surface of the anode current collector on a side away from the electrolyte membrane is covered with the water repellent layer, and
    the unit cells having the second cell structure are disposed apart from an end of the cell stack in the stacking direction.

* * * * *